No. 761,313. PATENTED MAY 31, 1904.
W. R. MACKLIND.
BOILER.
APPLICATION FILED SEPT. 14, 1903.
NO MODEL. 7 SHEETS—SHEET 1.
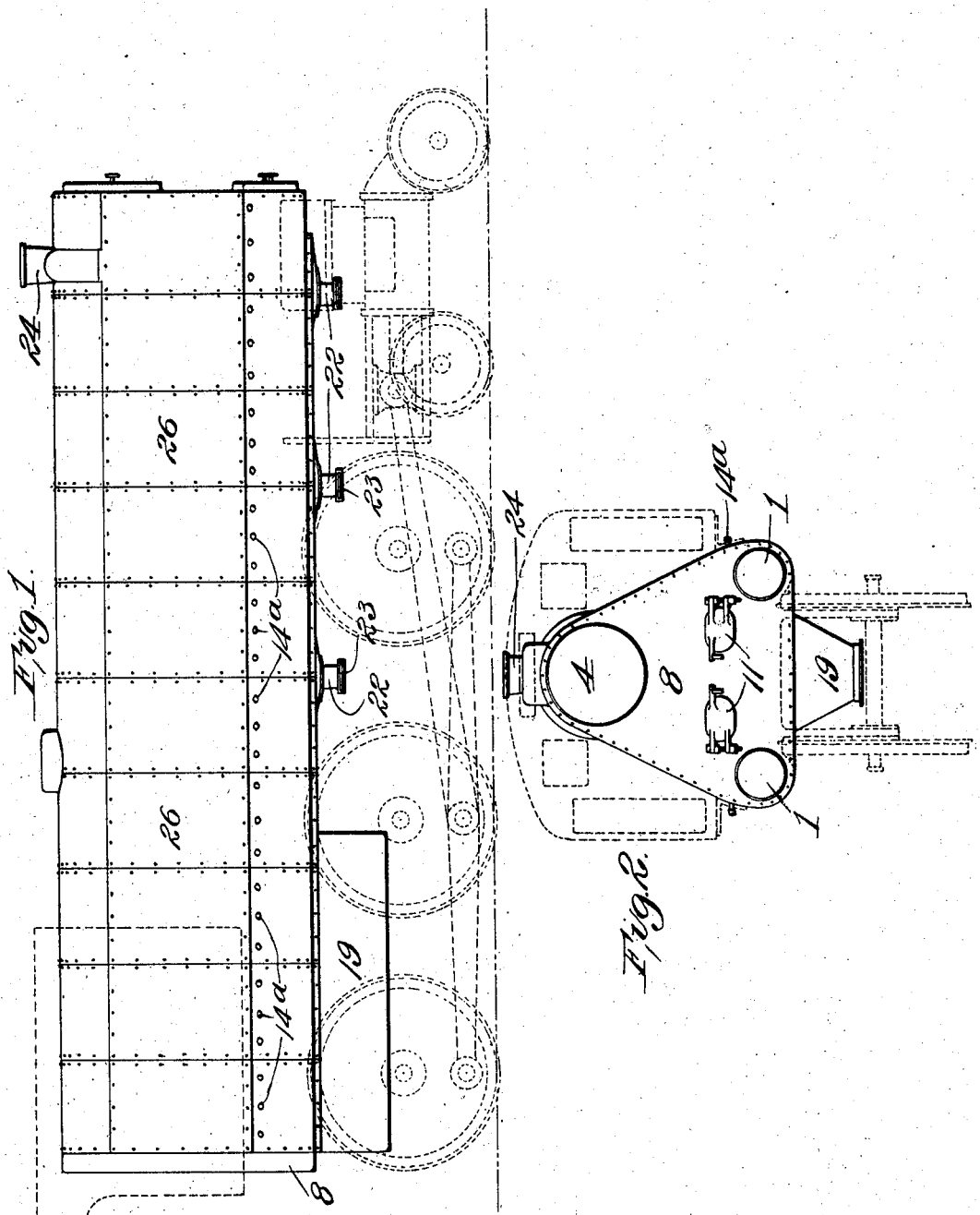

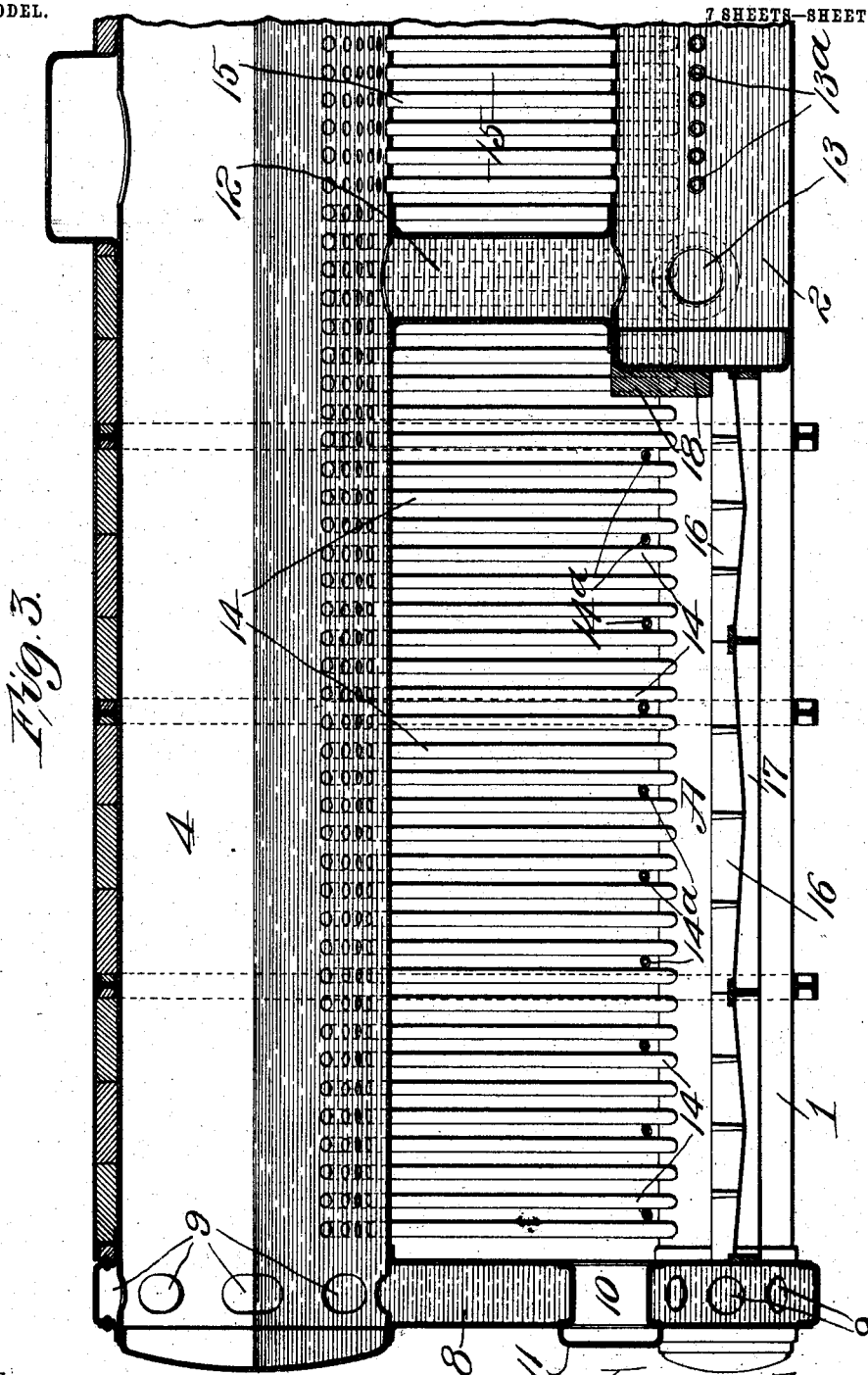

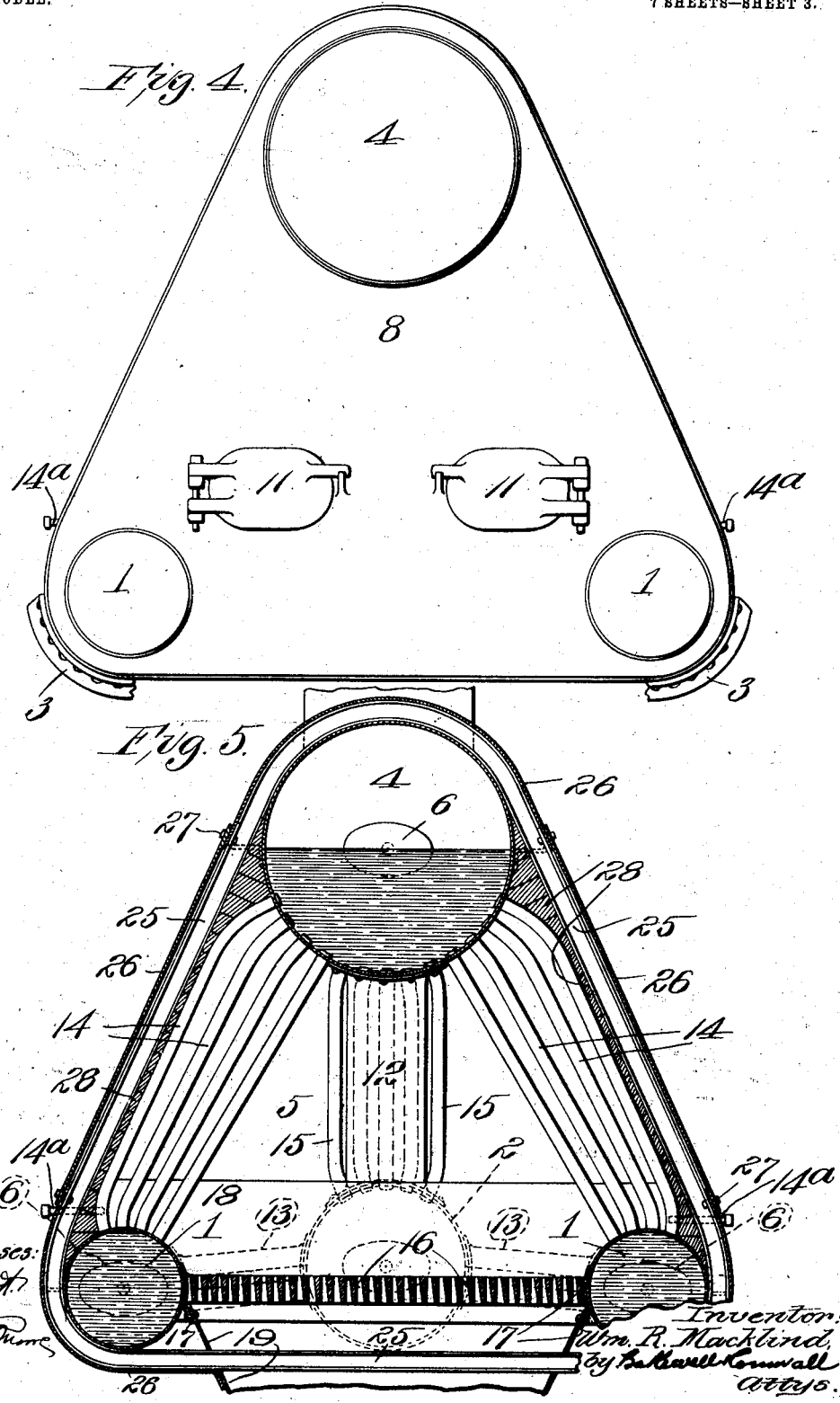

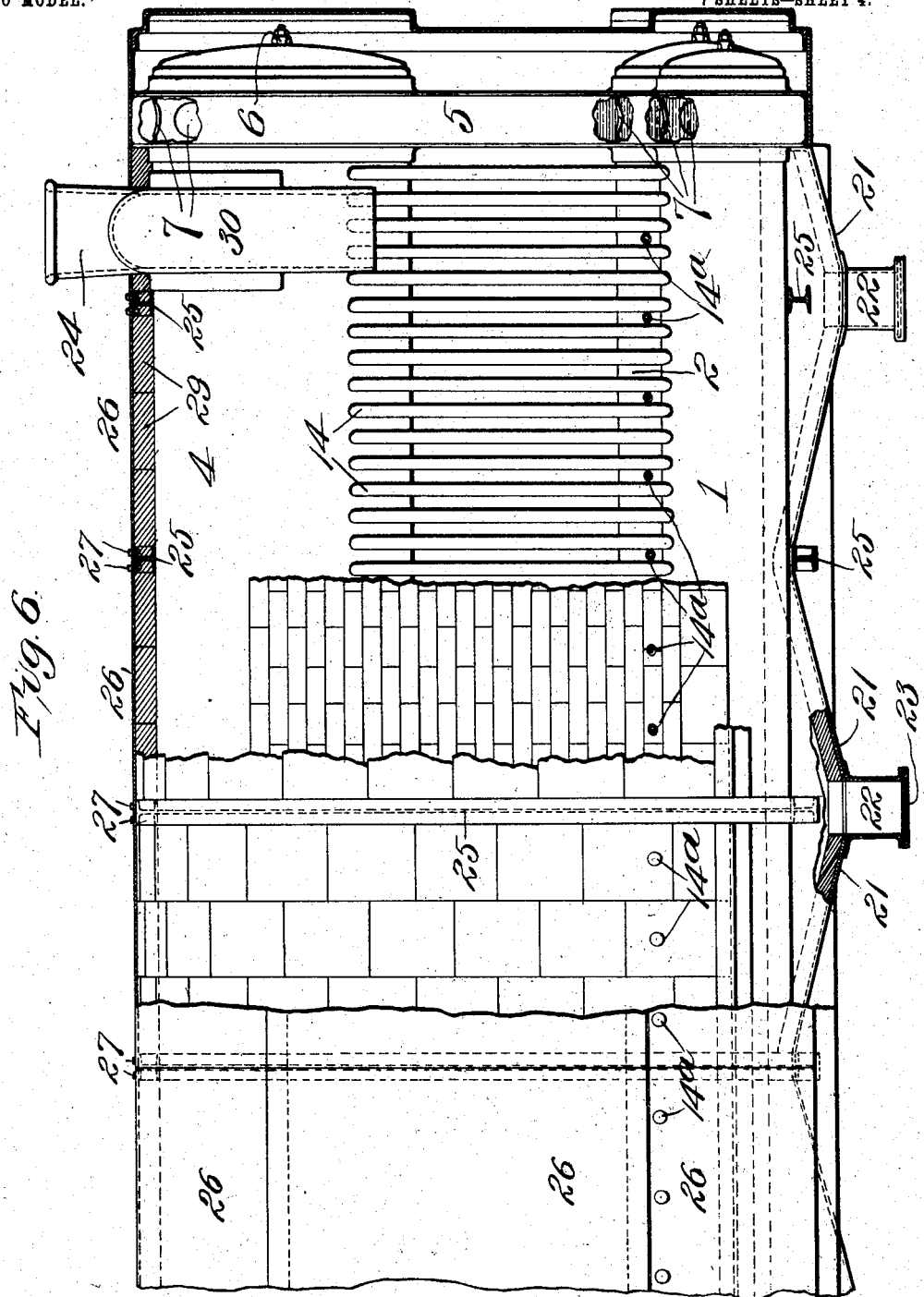

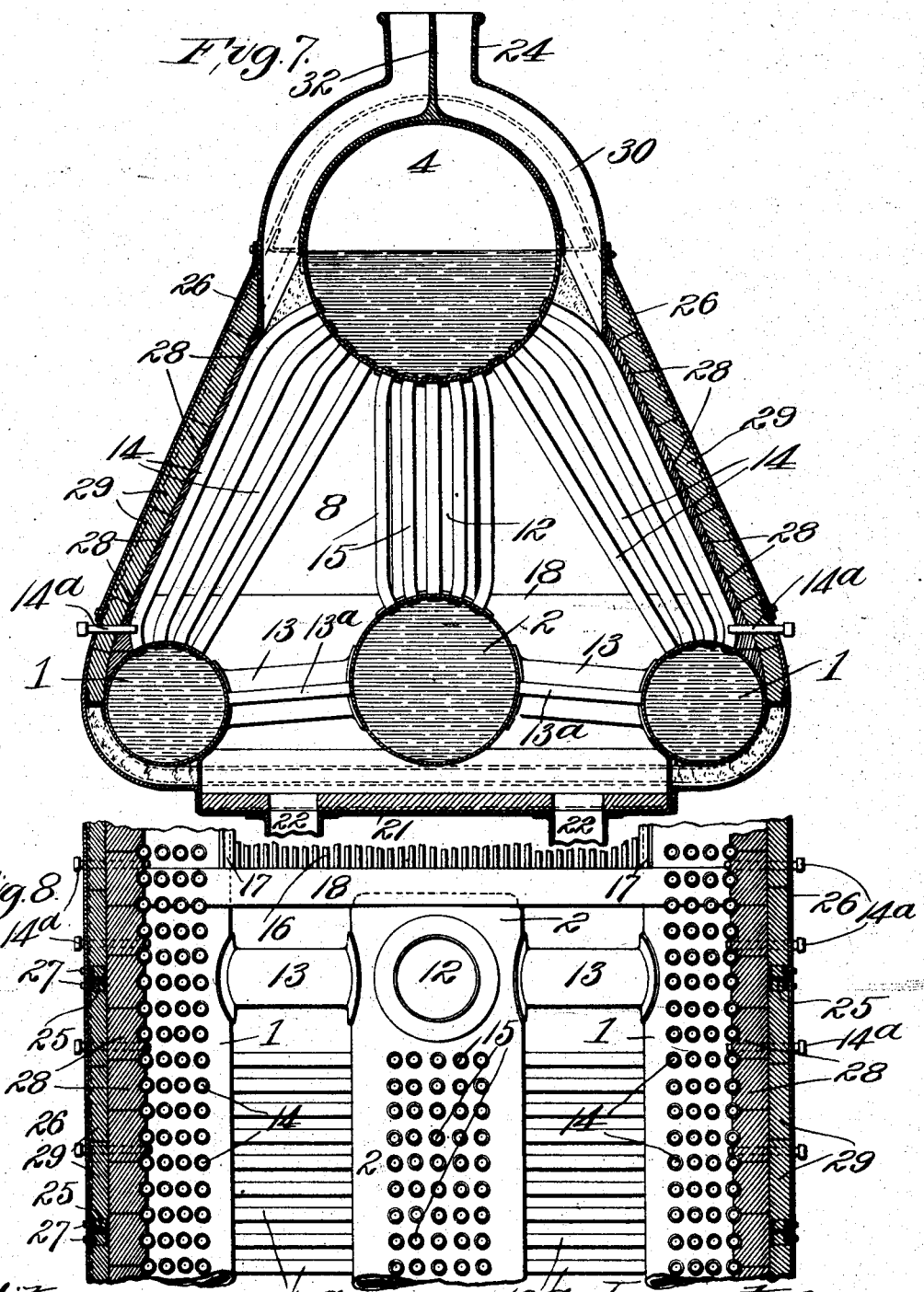

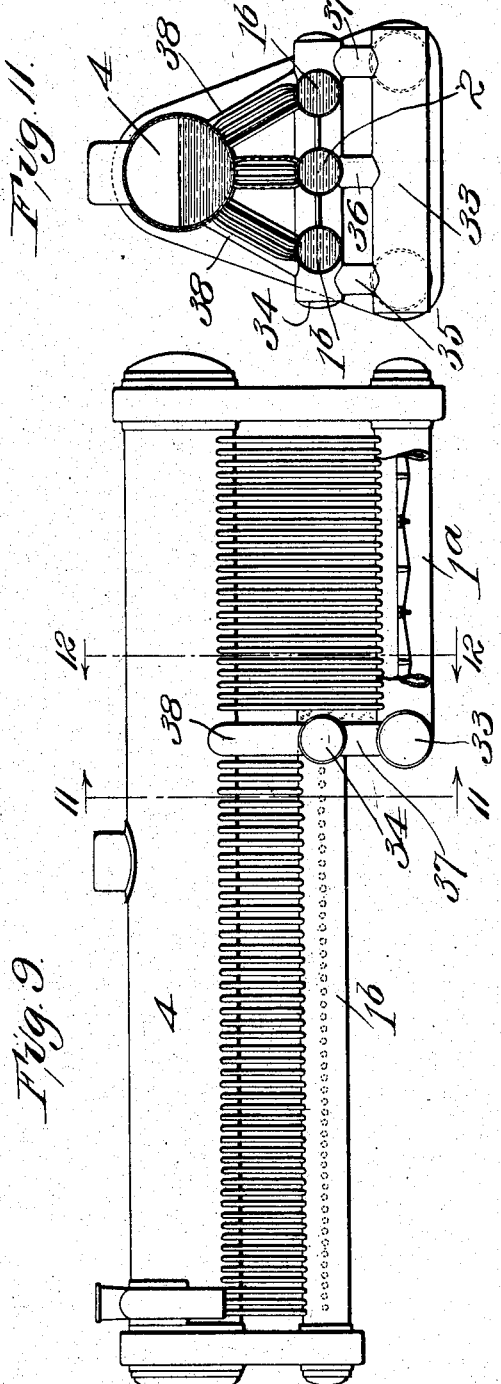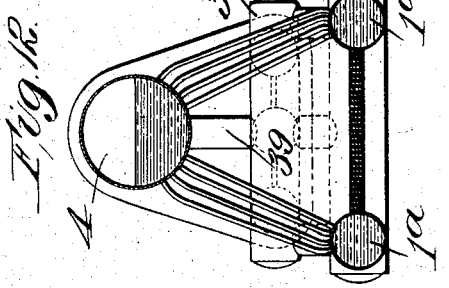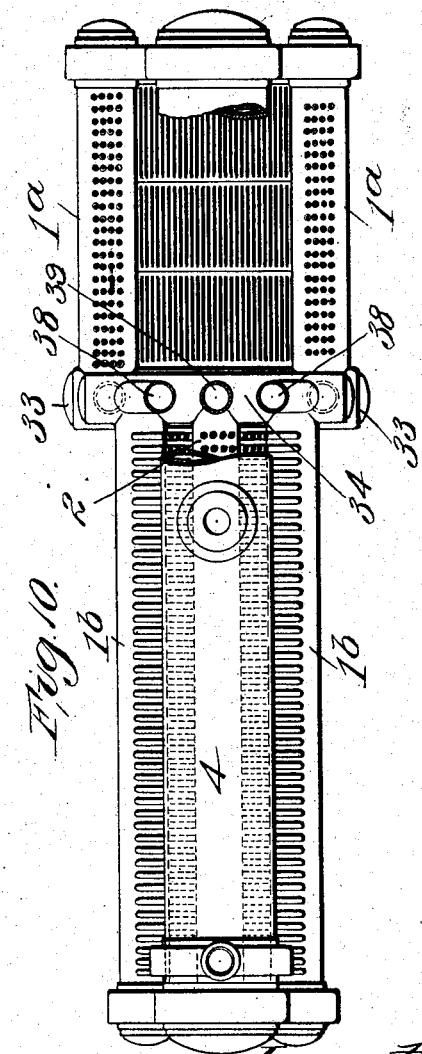

No. 761,313. PATENTED MAY 31, 1904.
W. R. MACKLIND.
BOILER.
APPLICATION FILED SEPT. 14, 1903.
NO MODEL. 7 SHEETS—SHEET 7.
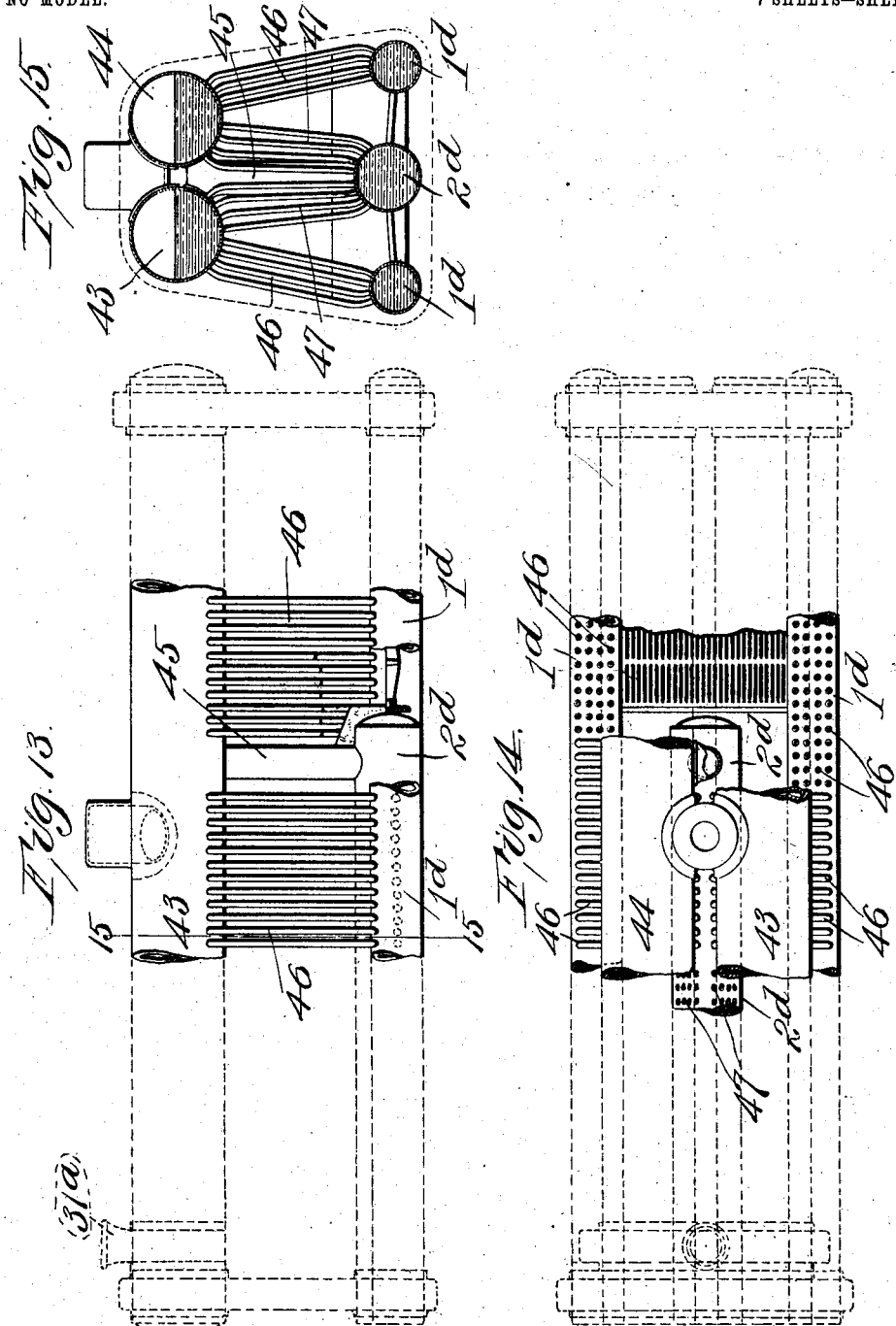

No. 761,313. Patented May 31, 1904.

UNITED STATES PATENT OFFICE.

WILLIAM R. MACKLIND, OF ST. LOUIS, MISSOURI.

BOILER.

SPECIFICATION forming part of Letters Patent No. 761,313, dated May 31, 1904.

Application filed September 14, 1903. Serial No. 173,110. (No model.)

*To all whom it may concern:*

Be it known that I, WILLIAM R. MACKLIND, a citizen of the United States, residing at St. Louis, Missouri, have invented a certain new and useful Improvement in Boilers, of which the following is a full, clear, and exact description, such as will enable others skilled in the art to which it appertains to make and use the same, reference being had to the accompanying drawings, forming part of this specification, in which—

Figure 1 is a side elevation showing a boiler as applied to a locomotive. Fig. 2 is a rear elevation. Fig. 3 is a substantially centrally longitudinal sectional elevation of the rear portion of the boiler. Fig. 4 is a rear elevation. Fig. 5 is a transverse sectional elevation through the fire-box. Fig. 6 is a view of the forward end of the boiler, said view being partly in section and portions being broken away to illustrate other parts. Fig. 7 is a transverse sectional elevation through the forward portion of the boiler. Fig. 8 is a horizontal view, partly in section, through the forward portion of the boiler. Fig. 9 is a side elevation illustrating a modification, the casing-plates being removed and a portion of one of the drums being broken away. Fig. 10 is a plan view, partly in section, of the construction illustrated in Fig. 9. Fig. 11 is a transverse elevation, partly in section, on about the line 11 11 of Fig. 9. Fig. 12 is a transverse elevation, partly in section, on about the line 12 12 of Fig. 9. Fig. 13 is a fragmentary sectional elevation illustrating a further modification. Fig. 14 is a fragmentary plan view of the parts shown in Fig. 13, and Fig. 15 is a transverse sectional elevation on about the line 15 15 of Fig. 13.

This invention relates to improvements in boilers, the present device being particularly adapted to use as a locomotive-boiler, and, generally considered, the present structure is that of a water-tube boiler capable of use upon locomotives as distinguished from the fire-tube boilers commonly employed for the purpose indicated.

One object of the invention is to provide increased heating-surface.

Another object is to provide a structure which can be easily cleaned and repaired.

Another object is to provide a structure which almost entirely makes the use of stay-bolts unnecessary.

Another object is to provide a structure by the use of which the emission of cinders from the smoke-stack is greatly reduced, if not entirely obviated.

A further object is to provide a boiler whose center of gravity is very low, thus insuring stability; and another object is to provide a locomotive-boiler of such construction that the engineer in the cab is given a wide range of vision of the track ahead.

To these ends and also to improve generally upon devices of the character indicated the invention consists in the various matters hereinafter described and claimed.

Referring now more particularly to the drawings and at this time to Figs. 1 to 8 thereof, 1 1 indicate side drums at the bottom of the boiler and extending longitudinally the whole length of the boiler, and 2 indicates a central longitudinal bottom drum which extends from the front of the boiler backwardly to the front end of the fire-box, said drums 1 1 and 2 being here shown as resting upon suitable supporting-castings 3, carried by the locomotive-trucks. A centrally-located longitudinally-extending upper drum 4 extends the length of the boiler over the said drum 2, and all of the heretofore-mentioned drums have their forward ends extending through suitable openings in a forward substantially triangular manifold 5, the projecting ends of the drums being provided with manholes 6. The said drums are preferably cylindrical in cross-section, whereby greatest strength is secured, and at its portion included between the front and rear plates of the manifold each drum is provided with suitable openings 7, by means of which communication is established between the manifold and the interior of the drum. At the rear of the boiler is a second manifold 8, through which the side drums 1 and the upper drum 4 extend, the drums at their rear being provided with openings 9, which correspond to the before-mentioned openings 7 and establish communication between the said rear manifold 8 and the interiors of the several drums which pass through the same. This rear manifold is substantially triangular and has feed-openings 10 extending therethrough, by means of which access can be had to the fire-box A, these openings being provided with suitable doors 11. The lower central drum 2 extends only to the forward end of the fire-box. Its rear end is connected to the upper drum 4 by a substantially vertical water-leg 12 and is also connected to the side drums 1 by water-legs 13 and water-tubes 13$^a$. Small obliquely-set water-tubes 14 connect the upper drum with each of the lower side drums 1, and small substantially vertical water-tubes 15 connect said upper drum 4 with the central lower drum 2. Preferably blow-tubes 14$^a$ extend through the boiler-casing to enable cinders and the like to be blown from the exterior of the side drums and the tubes 14. The drums, manifolds, water-legs, and tubes of the boiler being arranged in the manner indicated, these elements serve to firmly brace each other and to present a strong structure. The boiler is substantially triangular, with the base of the triangle at the bottom of the boiler, so that the center of gravity is low. As the upper drum 4 need not be of as great diameter as is a locomotive-boiler of the usual fire-tube type, the width of the upper portion of the boiler is reduced, and the boiler does not obstruct the engineer's view ahead. The present boiler has a wide base and a relatively narrow top. The space between the side water-tubes 14 and between the rear manifold 8 and the water-leg 12 forms a fire-box, the grate 16 being suitably supported upon the side tubes 1, as by resting upon angle-irons 17, fastened to said side water-tubes. Preferably a bridge-wall 18, of fire-clay or other suitable material, extends across the front end of the fire-box at its bottom and protects the forward end of the central drum 2. The fire-box is of course provided with the usual ash-pan 19. Suitably supported between the central lower drum 2 and each side drum 1 are floor-plates 21, which preferably incline to discharge-chutes 22, provided with suitable valves 23, controlled by an attendant from the outside of the boiler. As the smoke passes through the boiler to the smoke-stack 24 it encounters the various water-tubes, particularly the tubes 15. The cinders in the smoke are thus caught and caused to fall upon said floor-plates 21. The cinders then fall into the discharge-chutes 22, and by opening the valves 23 at the end of each run the cinders thus collected will drop from the boiler. Extending about the drums and water-tubes heretofore described are substantially triangular stay-frames 25, which can be conveniently formed of I-beams, and the casing-plates 26 of the boiler are removably secured to said stay-frames, as by means of bolts 27. Fire-bricks 28, suitably recessed to receive the tubes 14, which are in the outer rows of said tubes, lie outside of said outer rows of tubes 14, and preferably sections of suitable packing 29, such as asbestos, are interposed between the casing-plates 26 and the fire-bricks or tiles 28. The triangular stay-frames can be secured to the drums by a relatively small number of rivets and serve to securely tie the parts of the boiler together. The casing-plates 26 can be readily secured to the stay-frames, and any portion of the interior of the boiler can be readily exposed by removing the proper casing-plates, packing, and fire-bricks 28. A suitable hollow casting 30, secured to the casing, has the smoke-stack 24 extending therefrom and has its interior in communication with the interior of the boiler, so that the smoke from the fire-box passes into this casting and out of the smoke-stack. A vertical partition 32 is preferably provided in the smoke-stack in order to prevent the currents of smoke coming from opposite sides of the boiler from interfering with each other.

Figs. 9 to 12 illustrate a modification of the present device. Its general structure is similar to that heretofore described. This modified form is particularly adapted to locomotives provided with high driving-wheels. In said figures, 1$^a$ represents side drums at the rear of the boiler, which correspond to the rear portions of the drums 1 (illustrated in Figs. 1 to 8)—i. e., those portions of the drums 1 which lie at the sides of the fire-box. The grate is supported upon said drums 1$^a$, as heretofore described. In a plane above the said rear side drums 1$^a$ are forward side drums 1$^b$, which extend from the front of the boiler to the front of the fire-box, said forward side drums 1$^b$ corresponding to the forward portions of the drums 1 in the construction first herein described. A lower horizontal manifold or connecting-drum 33 connects the forward ends of the rear side drums 1$^a$ with each other, and an upper horizontal manifold 34 connects the rear ends of the side drums 1$^b$ and the central drum 2. Vertical water-legs 35, 36, and 37 connect the said manifolds 33 and 34, and side oblique water-legs 38 connect the ends of the upper manifold 34 with the upper drum 4. A central vertical water-leg 39 connects the central drum 2 with the said upper drum 4, the said drums 2 and 1$^b$ being in substantially the same horizontal plane.

In the modification illustrated in Figs. 13 to 15 a plurality of upper drums, corresponding generally to the heretofore-described drums 4, are employed, these drums being marked 43 and 44. The drums 1$^d$ and 2$^d$ are similar in construction and arrangement to the drums 1 and 2 of the form shown in Figs. 1 to 8, and a water-leg 45 connects the central drum $2^d$ with the upper drum 43 and 44. Small oblique water-tubes 46, which correspond generally to the before-mentioned tubes 14, connect the respective drums $1^d$ with the respective drums 43 and 44, while oblique water-tubes 47 connect the drums 43 and 44 with the drum $2^d$. The smoke-stack $31^a$ is supported in a hollow casting 48, which is in turn supported upon the drums 43 and 44 and practically wedges between them.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. In a boiler, an upper water-drum, lower side water-drums, a grate supported between said side drums, a central lower water-drum extending from said grate toward the end of the boiler removed from the same, water-tubes connecting said upper drum and said central drum, and water-tubes at the sides of said grate and connecting said upper drum and said side drums; substantially as described.

2. In a boiler, an upper water-drum, lower side water-drums, a grate between said side drums, a lower central water-drum extending from said grate toward the end of the boiler removed from the same, a water-leg connecting said central drum and said upper drum, substantially horizontal connection between the said side drums and the rear end of said central drum, and water-tubes connecting said upper drum and said side drums and at the sides of said grate; substantially as described.

3. In a boiler, front and rear manifolds, an upper water-drum entering said manifolds and having one end extending through one of them, lower side water-tubes each of which has one end extending through one of said manifolds and is in connection with both said manifolds, manholes in the exposed ends of said drums, a grate supported between said side drums, one of the manifolds having fuel-openings therethrough leading to said grate, and water-tubes connecting said side drums and said upper drum and at the sides of said grate; substantially as described.

4. In a boiler, a casing, a grate, an upper water-drum extending forwardly beyond said grate, lower water-drums also extending forwardly beyond said grate, water-tubes connecting the portions of said drums which extend beyond said grate, whereby said tubes are in the path of travel of the smoke, and a floor between said extending portions of said lower drums, said floor being provided with cinder-openings; substantially as described.

5. In a boiler, upper and lower water-drums, water-tubes connecting said drums, stay-frames extending continuously about the space whose corners are defined by said drums, said stay-frames bearing against said drums at said corners, whereby said drums are tied together, and a casing connected to said stay-frames; substantially as described.

6. In a boiler, an upper water-drum, lower side water-drums, a lower intermediate water-drum, said intermediate drum being of less length than said other water-drums, whereby a fire-box space is produced, a front manifold to which all of said water-drums are connected, a rear manifold to which said upper and side drums are connected, and connection between the rear end of said intermediate water-drum and each of said other water-drums; substantially as described.

7. In a boiler, an upper water-drum, lower side water-drums extending only a portion of the length of said boiler, a second set of lower side water-drums in a plane above said first-mentioned lower side water-drums and extending the remainder of the length of said boiler, a grate between said first-mentioned side water-drums, manifolds connecting said several drums, and water-tubes extending between said upper drum and said side drums; substantially as described.

In testimony whereof I hereunto affix my signature, in the presence of two witnesses, this 9th day of September, 1903.

WILLIAM R. MACKLIND.

Witnesses:
GALES P. MOORE,
GEORGE BAKEWELL.